INVENTOR

SAMUEL H. BICKEL

Harold C. Meier

ATTORNEY

# United States Patent Office 3,539,807
Patented Nov. 10, 1970

3,539,807
TEMPERATURE - EMISSIVITY SEPARATION AND TEMPERATURE INDEPENDENT RADIOMETRIC ANALYZER
Samuel H. Bickel, Dallas, Tex., assignor to Texas Instruments Incorporated, Dallas, Tex., a corporation of Delaware
Filed Apr. 4, 1968, Ser. No. 718,757
Int. Cl. G01j 7/09
U.S. Cl. 250—83.3      16 Claims

ABSTRACT OF THE DISCLOSURE

Apparatus and a method for producing a target identification by means of radiometric techniques generating a temperature independent target composition identification signal. Differences between the radiation power from a target and a reference body at two independent wavelengths are combined to produce the target identification signal. In the usual manner, detection of the radiation power from the target and the reference source results in a power difference signal for each of the wavelengths which is independent of extraneous sources. These power difference signals are weighted to compensate for system parameters and a DC bias voltage added to enable subsequent logarithmic amplification of the weighted difference signals. After logarithmic amplification, additional weighting takes place to properly ratio the various independent wavelength difference signals to each other. A temperature independent target composition identification signal is produced by taking the difference between at least two of the weighted outputs of the logarithm amplifiers and a target temperature signal will be produced from a summation of at least two of the weighted power difference signals after logarithmic amplification.

---

Figure 1:
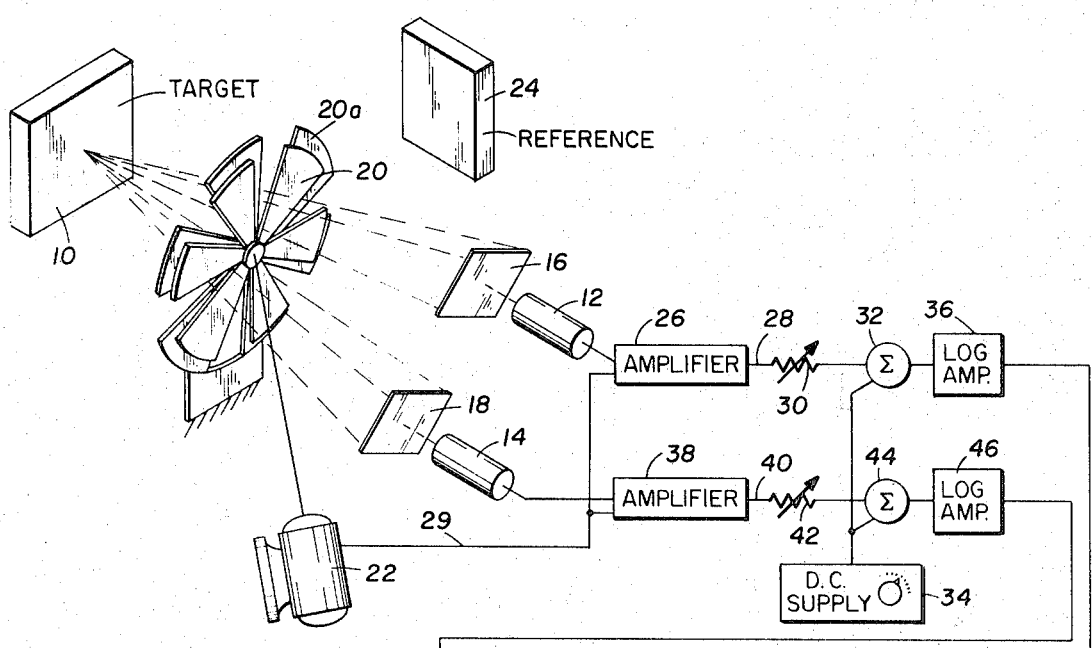

This invention relates to target identification, and more particularly to radiometric techniques of target identification using power difference signals at several wavelengths to produce a temperature independent target composition signal.

Radiation continuously emitted from all objects results from the acceleration of electrical charges within the material. Because the interactions of these charges in solid bodies are very complex, it is difficult to apply electromagnetic theory directly; instead, thermodynamics is used to predict and explain the radiative behavior of bodies. From this approach there has developed the useful concept of the ideal radiator, or black body source, having radiation characteristics completely specified by temperature. The radiation power emitted by an imperfect radiator within a small spectral interval centered at a wavelength $\lambda$ and that emitted by an ideal black body are related by a temperature-independent constant known as the radiator emissivity. Mathematically, this can be expressed by:

$$R(\lambda, T) = \epsilon(\lambda) R_{bb}(\lambda, T) \qquad (1)$$

where:

$R(\lambda, T)$ is the radiation power emitted by a unit area of the source at temperature T within a specified small spectral interval centered at wavelength $\lambda$, $R_{bb}(\lambda, T)$ is the power per unit area radiated per unit area of a perfect radiator, that is, a black body, at temperature T within a specified small spectral interval centered at wavelength $\lambda$, and $\epsilon(\lambda)$ is the emissivity of the source within a specified small spectral interval centered at wavelength $\lambda$.

The term $R_{bb}$ is related to $\lambda$ and T by Planck's radiation formula:

$$R_{bb}(\lambda, T) = \frac{2\pi c^2 h}{\lambda^5 \left[\exp\left(\frac{hc}{\lambda k T}\right) - 1\right]} \qquad (2)$$

where:

$c$ is the velocity of light,
$h$ is Planck's constant, and
$k$ is Boltzmann's constant.

It follows from Equation 1 that the emissivity of a body is given by the quotient of the power radiated by the body and the power that would be radiated by a black body of the same temperature. Since it is independent of temperature, the emissivity characterizes the radiant character of the body and, thus, can be used to classify or identify the physical composition of the body by comparison with known emissivity curves.

Heretofore, target identification by means of radiation techniques have measured the radiant power from a body at an unknown temperature. The assumption was made that several targets in proximity are all at the same ambient temperature and an educated guess of the temperature was made. Black body radiation at the estimated temperature was calculated and from this the target emissivity was estimated to identify the physical composition thereof. However, actual temperature measurements show that different materials can differ in temperature by as much as 40° F. as a result of uneven heating in the sunlight. Thus, a reasonable conclusion is that the temperature as well as the emissivity of a body varies with the material and previous techniques of estimating temperature produced erroneous composition identification.

In accordance with the present invention, measurements of the power spectrum at two or more spectral bands are combined to separate the temperature effects from the emissivity effects to identify the composition of a body. Radiant energy from a target and a reference black body is alternately directed to radiation detectors through filters designed to pass only selected wavelengths of the spectral band. In the usual manner, differential amplification of the reference radiant energy signal and the target radiant energy signals produces a power difference signal for each wavelength independent of extraneous power levels. Each power difference signal is amplified in a logarithmic amplifier and weighted; two or more of the weighted logarithmic signals are combined to produce a temperature independent target composition identification signal. A summation of two of the weighted logarithm signals produces a target temperature signal representing body temperature changes.

An object of the present invention is to provide radiometric target identification by combining measurements of the power spectrum at two or more spectral bands. Another object of this invention is to provide radiometric target identification where temperature effects are eliminated in the composition identification signal. A further object of this invention is to provide a measurement of target temperature by means of radiometric techniques. A still further object of this invention is to provide radiometric target identification by means of the relationship which exists between the logarithm of the incident power from an unknown target and that of a reference target. Other objects and advantages will be apparent from the specification and claims and from the accompanying drawings illustrative of the invention.

Figure 3:
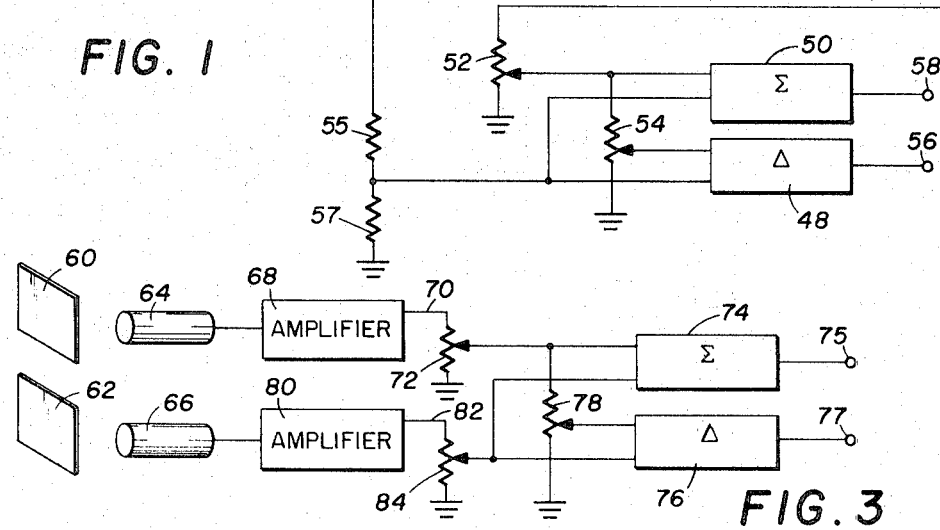
Figure 4:
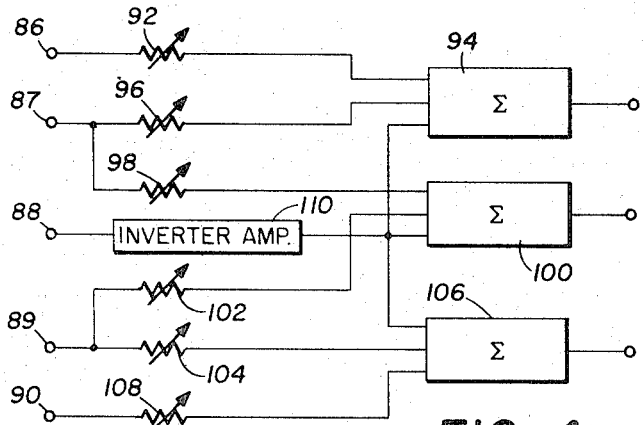
Figure 2:
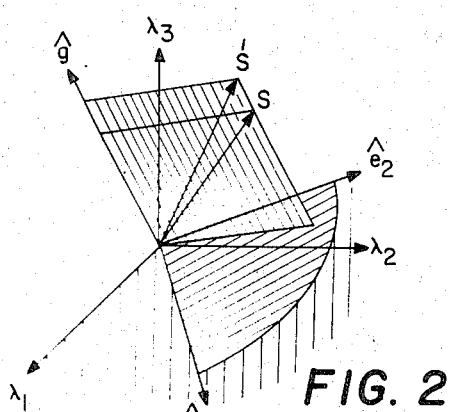
Figure 5A:
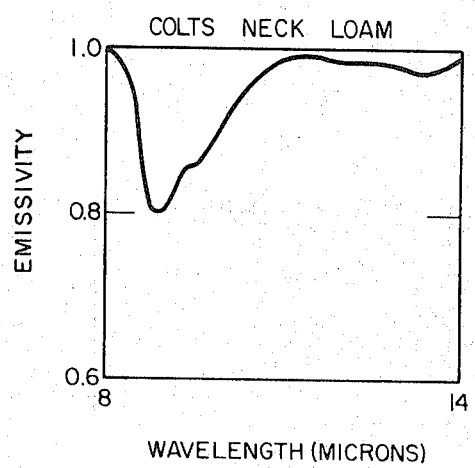
Figure 5B:
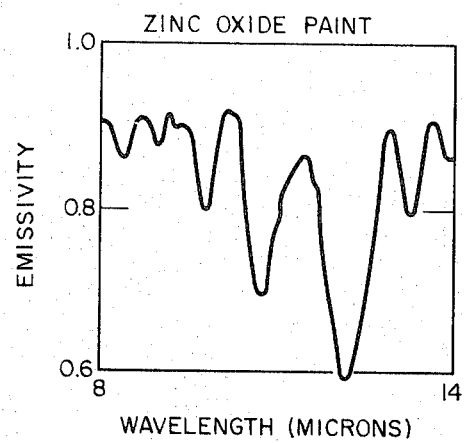
Figure 5C:
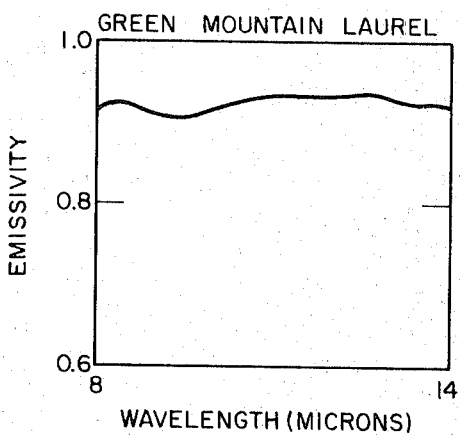
Figure 5D:
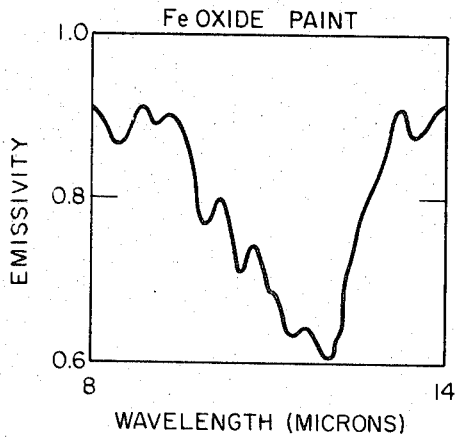

Referring to the drawings:

FIG. 1 is a block diagram of a target identification system with logarithm amplifiers, FIG. 2 is a vector diagram illustrating the temperature independence of a composition signal produced by the system of FIG. 1, FIG. 3 is a block diagram of an alternate embodiment of the detection section of the system of FIG. 1, FIG. 4 is a partial block diagram of a detection system employing more than two spectral bands to eliminate temperature effects in a composition signal, and FIGS. 5A–5D are plots of emissivity versus wavelength in microns for several selected materials.

Referring to FIG. 1, a target 10 of unknown composition and temperature continuously emits radiation which is incident upon infrared detectors 12 and 14 after passing through filters 16 and 18, respectively. A selector wheel 20 rotated by means of an electric motor 22 passes or blocks the radiation emitted from the target 10 to the detectors 12 and 14. In the position shown, the selector wheel 20 passes radiation emitting from the target 10 to the detectors. When the selector wheel 20 has been rotated 30°, radiation from the target 10 is blocked and radiation from a reference black body 24 reflects from the background reflector 20a through the filters 16 and 18 to the detectors 12 and 14. Thus, the radiation incident upon the detectors 12 and 14 alternates every 30° of rotation of the wheel 20 between the target 10 and the reference body 24. Many other methods can be used to alternate the radiation incident on the detectors 12 and 14 between the target 10 and the reference source 24. The selector wheel 20 is intended as only one example. A thorough discussion of radiation measuring techniques is found in the "Handbook of Military Infrared Technology," Office of Naval Research, Department of the Navy.

The reference source 24 emits black-body or thermal radiation which is defined as the electromagnetic radiation present in any region of empty space at thermodynamic equilibrium at temperature T. Black-body radiation is isotropic and unpolarized and has a continuous distribution of frequencies. It is of practical importance as being the maximum amount of radiation that can be emitted by a hot solid body. It is of theoretical importance in the history of physics because through study of its properties Planck was led in 1900 to the initial ideas of quantum theory. hTe system of this invention makes use of Planck's radiation formula describing the radiation character of heated materials.

The output of the detector 12 alternates proportionally between the radiant flux density from the target 10 and the reference source 24 at the particular spectral band passed by the filter 16. This produces a two level alternating signal which after amplification and rectification in an amplifier 26 produces a DC signal on the line 28 proportional to the radiation power difference between the target 10 and the reference source 24 independent of extraneous power sources. The operation of the amplifier 26 is synchronized with the motor 22 to correctly polarize the DC signal on line 28 by means of a connection 29. An adjustable resistor 30 provides a means for weighting the power difference signal to eliminate system variations and a summing network 32, connected to a variable DC supply 34, biases the weighted differential power signal prior to amplification in a logarithm amplifier 36. Similarly, the detector 14 produces an output signal proportional alternately between the radiant flux density from the target 10 and the reference source 24 at the spectral band passed by the filter 18. The spectral or wavelength band passed by the filter 18 is independent of that band passed by the filter 16. An amplifier 38 operates to amplify and rectify the dual level alternating signal resulting from the power emitted by the reference source 24 from the power emitted by the target 10 to produce a radiation power differential signal on a line 40 again independent of extraneous power sources. The operation of the amplifier 38 is also synchronized with the motor 22 by means of the interconnection 29. A variable resistor 42 provides a means for weighting the power difference signal on line 40 and a summing network 44, connected to the supply 34, biases the power difference signal from the amplifier 38 prior to amplification in a logarithm amplifier 46.

Typically, the log amplifiers 36 and 46 are standard operational amplifiers with a three terminal transistor connected in the feedback loop. In the usual manner, the transistor emitter electrode connects to the operational amplifier output terminal and the base and collector electrodes are interconnected to the input terminal along with the weighted power difference signal from the summing networks. The outputs of the amplifiers 36 and 46 are connected to a difference network 48 and a summing network 50. Potentiometers 52 and 54 are connected in the signal line from the amplifier 36 to weight the logarithmic output therefrom. A voltage divider, including resistors 55 and 57, is included in the line from the amplifier 46 and provides a means for weighting the logarithmic output therefrom along with the potentiometer 52. The difference network 48 produces a temperature independent target composition identification signal at terminal 56 from the two weighted radiation power difference signals from the amplifiers 36 and 46. A summation of the two output signals from the amplifiers 36 and 46 in the summation network 50 produces a target temperature signal at a terminal 58. From these two target related signals, the target composition and temperature can be determined by a comparison to standard characteristic curves of various known materials.

In operation, the system employs the relationship which exists between the logarithm of the incident power from the target 10 and that from the reference source 24. At a wavelength $\lambda_i$ this relationship can be written as:

$$S_i = \ln P_i/P_r = \ln \epsilon_i + \zeta g_i(1+\Delta) \qquad (3)$$

where:

$P_i$ is the incident power from the target 10,
$P_r$ is the power from the reference black-body source 24,
$\epsilon_i$ is the emissivity of the target 10,
$\zeta = 1 - T_o/T$,
T is the temperature of the target 10,
$T_o$ is the temperature of the reference source 24,
$g_i = x_i(1-\exp[-x_i])$,
$x_i = hc/\lambda_i kT$, and $\qquad (4)$ $\Delta$ is the fractional error that results from the expansion of $S_i$ by the first term of the expansion about $\zeta=0$. At the frequencies of interest, and within normal temperature ranges, the $\Delta$ term can be neglected thus simplifying Equation 3. Table I illustrates the probable percent error for a wavelength of 12 microns and a reference source temperature of 300° Kelvin. Note that for a temperature variation of from 75° K. through 600° K., the error is less than 4% and for all practical purposes can be neglected.

TABLE I

| Temperature degrees Kelvin | $\zeta = 1 - T_o/T$ | (Δ) percent error |
|---|---|---|
| 75 | −3 | 1.7 |
| 150 | −1 | 1.4 |
| 200 | −½ | .9 |
| 300 | 0 | 0 |
| 400 | ¼ | 1.3 |
| 600 | ½ | 4.0 |
| 1,200 | ¾ | 9.7 |

Assuming the fractional error $\Delta$ can be neglected, a temperature independent composition signal can be generated by the elimination of the $\zeta$ term from any two such measurements. For example, assuming $S_1$ and $S_2$, measured at wavelengths $\lambda_1$ and $\lambda_2$, respectively, it follows that $\zeta$ can be eliminated from any two such measurements to form a temperature independent signal as given by the expression:

$$\rho(\lambda_1, \lambda_2) = S_1/g_1 - S_2/g_2 = 1/g_1 \ln \epsilon_1 - 1/g_2 \ln \epsilon_2 \qquad (5)$$

At higher frequencies in the infrared or optical regions, $g_i$ approaches $x_i$ and by substituting Equation 4 into Equation 5 the following expression can be written:

$$\frac{hc}{kT}\rho(\lambda_1, \lambda_2) = \lambda_1 S_1 - \lambda_2 S_2 = \lambda_1 \ln \epsilon_1 - \lambda_2 \ln \epsilon_2 \quad (6)$$

Although a signal produced in accordance with Equation 6 will identify a particular composition independent of temperature, a more positive identification is assured by forming $\rho(\lambda_i, \lambda_i+1)$ for a large number of sample points.

An important feature of this invention is the temperature independence of the composition signal on terminal 56, as discussed above. To further emphasize this point, the Schmidt orthogonalization process will be applied to the target composition signal $S_i$ sampled at wavelengths $\lambda_1, \lambda_2 \ldots \lambda_n$, to construct temperature independent target composition vectors as shown in FIG. 2. If $S_i$, $g_i$, and $\ln \epsilon_i$, $i=1, 2 \ldots m$, is the $i$th component of the vectors $S$, $g$ and $\beta$, respectively, then Equation 3 can be written in vector notation as $$S = \beta + \zeta g \quad (7)$$

now, if $<x, y>$ denotes the scalar product of two vectors $x$ and $y$, then a vector $z$, defined by $$z = S - \frac{<S, g>}{<g, g>} g \quad (8)$$

with be orthogonal to $g$. From the above two equations, it follows that by simple substitution the vector $z$ will be equal to $$z = \beta - \frac{<\beta, g>}{<g, g>} g \quad (9)$$

Thus, the vector $z$ is a temperature independent vector completely specified by the emissivity of the material. Since the vector $g$ is $m$ dimensional, it follows that there can be constructed $m-1$ mutually orthogonal vectors orthogonal to $g$. These vectors can be used as a base vector for $z$ with the result that $$z = \sum_{i=1}^{m-1} <\beta, \hat{e}_i> \hat{e}_i \quad (10)$$

where $\hat{e}_i$, $i=1, 2 \ldots m-1$, are a set of orthonormal vectors orthogonal to the vector $g$. It follows that there are $m-1$ linear independent temperature parameters for $m$ sample points of the radiometric power spectrum. These parameters can be used to identify the composition of a target, and the component along the vector $g$ can be used to determine its temperature.

The vector diagram of FIG. 2 illustrates this concept of radiometric target identification for a three wavelength system. A change in the temperature of the target 10 causes a corresponding change in the voltage signals from detectors at each of three wavelengths $\lambda_1$, $\lambda_2$, and $\lambda_3$, which in turn rotates the power vector from S to $S^1$. Planck's equation constrains the changes due to temperature to remain parallel to the $\hat{g}$ axis. Thus, although measurements along all three wavelength axes will be affected by the temperature change, the components of S in the plane perpendicular to $\hat{g}$ (i.e. the $\hat{e}_1$, $\hat{e}_2$ plane) are unaffected. Since in this discussion $m=3$, there are two temperature independent parameters (i.e. the components along $\hat{e}_1$ and $\hat{e}_2$) which can be used to identify the target. On the other hand, the component along $\hat{g}$ gives a direct measurement of target temperature change.

Where the power spectrum is sampled at only two frequencies, such as by a system shown in FIG. 1, then $m=2$ and only one $\hat{e}$ vector and corresponding target parameter exists. Taking the components of $\hat{g}$ as $(g_1, g_2)$ the $\hat{e}$ vector orthogonal to $g$ will be in the $(g_2, -g_1)$ direction. From the preceding discussion, it will appear that the target parameter is given by $<\beta, \hat{e}>$ which in turn is equal to a constant times $\rho(\lambda_1, \lambda_2)$, where $\rho(\lambda_1, \lambda_2)$ is a temperature independent target composition signal as given by Expression 5.

The basic target identification technique described above was developed from the logarithm of the ratio of the emitted power from the target 10 to that emitted from the reference source 24. Unfortunately, known measurement devices (scanners, radiometers, etc.) measure neither this ratio nor the incident power from a target directly. It will now be shown how these known measurement devices produce a target identification signal. The energy incident on the detectors 12 and 14 at any given time is partially from radiation from the target 10 and partially from extraneous sources surrounding the target.

Assuming a linear transfer function for the detectors 12 and 14, the effects of extraneous sources can be removed, for the most part, by producing a signal proportional to the difference between the response from the reference source 24 and the response of the target 10. If the measuring system has a transfer function of $a(\lambda)$, the radiation power difference at the output of the amplifiers 26 and 38 is given by $$v = a(\lambda)[P(\lambda, T) - P_r(\lambda, T_0)] \quad (11)$$

which can be simplified to $$v = w[q + qt + t] \quad (12)$$

where $$w = a(\lambda) R_0(\lambda, T_0) = \text{system weight} \quad (13)$$

$$q = \frac{\epsilon(\lambda) - \epsilon_0(\lambda)}{\epsilon_0(\lambda)} = \text{ralative emissivity change} \quad (14)$$

$$t = \frac{R_{bb}(\lambda, T) - R_{bb}(\lambda, T_o)}{R_{bb}(\lambda, T_o)}$$

$$= \text{relative black-body power change} \quad (15)$$

If $u$ is set equal to $v./w.$ then, from Equation 12, $$u = q + qt + t \quad (16)$$

and by a simple expansion, $$(1+u) = (1+q)(1+t) \quad (17)$$

$$= (\epsilon/\epsilon_0)(R/R_0)$$

$$= P_i/P_r$$

From the above expressions it follows that, $$\ln(1+u) = \ln(P_i/P_r) \quad (18)$$

the basic identification Equation 3 given above.

The calculation of $u$ requires a second reference source (not shown) with known values of $q$ and $t$ to eliminate the system weight, $w$, from the measured radiant energy. This second reference source having known emissivity and at a known temperature, replaces the target 10 during calibration. From Equation 12, $w$ can be found by dividing the voltage measured from this second reference source by the value of $u$, computed from the values of $q$ and $t$ associated with the second reference. The simplest and possibly best choice for the second reference source is one with the same emissivity as the first reference source 24 in which case $q=0$ and $u=t$.

Referring the above discussion to the system of FIG. 1, the output of the log amplifiers 36 and 46 is given by the expression $$\ln(a + w_1 u_1) \quad (19)$$
$$\ln(a + w_2 u_2) \quad (20)$$

respectively. To make the output of the amplifiers 36 and 46 represent signals as given by Equation 18 above, it is necessary to calibrate the system by adjusting the variable resistors 30 and 42 and the DC supply 34. Calibration of the system can be accomplished by first adjusting the potentiometers 52 and 54. This circuitry along with the networks 48 and 50 can be considered as rotating the basic composition vector, S, so as to develop outputs along the temperature axis, $\hat{g}$, and the emissivity axis, $\hat{e}$. From the vector relationships developed with respect to a discussion of FIG. 2, it follows that if the potentiometer 52 is adjusted such that the gain equals the ratio of ($g_2/g_2$), which is aproximately ($\lambda_2/\lambda_1$) at infrared wavelengths, then the output at terminal 58 will be proportional to $S \cdot \hat{g}$. Since $\hat{e}_1$ is perpendiclular to $\hat{g}$, it follows that by appropriately adjusting the potentiometer 54 there will be produced the components $s \cdot \hat{e}$ at the output of the difference network 48 at terminal 56. Mathematically, setting the potentiometer 54 produces a gain $G_2 = (\lambda_1/\lambda_2)^2$. Next, the DC supply 34 is adjusted such that $a=1$; this requires a zero output signal from both the log amplifiers 36 and 46 when looking at the first reference target. With this adjustment, the output of the log amplifiers takes the form [ln $(1+wu)$] which approaches the Expression 18, above. Now assuming that the second reference is chosen such that $q=0$ at a known temperature, then the $w_1/w_2$ ratio can be set by adjusting the resistors 30 and 42 so that the signal on terminal 56 is zero while the amplitude level of $w_1$ and $w_2$ would be set by observing the output signal at terminal 58 and adjusting for proper normalization when looking at the second reference target. After adjusting the $w_1/w_2$ ratio, the output of the log amplifiers 36 and 46 takes the form given by the Expression 18. Thus, the system of FIG. 1 develops at the output of the log amplifiers 36 and 46 the logarithm of the ratio of emitted power from the target 10 to that emitted from the reference source 24.

Logarithmic amplifiers 36 and 46 placed after the summing networks 32 and 44, respectively, each produce a signal from which the temperature independent target composition signal given by Equation 6 can be generated by making use of a weighted difference between two logarithmic signals. The temperature of the target 10 can be derived by a weighted sum of the outputs of the logarithm amplifiers 36 and 46. Weighting in both cases being performed by the potentiometers 52 and 54. Logarithmic amplification after linear subtraction, in conjunction with an additive DC voltage, also removes the product of relative emissivity change and relative black-body change from the target identification signal as given in Equation 6.

From the above discussion, it might be logically concluded that logarithmic amplification could be performed directly on the signals from the detectors 12 and 14 to produce a logarithmic radiant power difference signal instead of a linear signal in which case the voltage output from the amplifiers 26 and 39, generating a difference in the logarithms of radiant power from the target 10 and the reference source 24, would produce an identification signal directly. However, since the energy incident on the detectors at any given time is partially from extraneous sources, the logarithmic difference would be given by $$\log [(R-R_e)/(R_o-R_e)]$$

where $R_e$ is the radiation from extraneous sources. The advantage of the amplifiers 26 and 38 is that $R_e$ will be eliminated for the most part.

A second system for implementation of target identification in accordance with this invention dispenses with the logarithmic amplifiers and the DC voltage source, as shown in FIG. 3. Filters 60 and 62 pass selective wavelengths of energy from the target 10 or reference source 24 to respective detectors 64 and 66. A second reference source (not shown) or the reference source 24 at two set temperatures is required for calibrating this system as was described previously with respect to the system of FIG. 1. An amplifier 68 produces a DC voltage on a line 70 which is independent of extraneous power and proportional to the radiation differential as before. The signal on the line 70 is weighted by means of a potentiometer 72 for connecting to a summing network 74 and a difference network 76 through a calibration potentiometer 78. For the second selected spectral band, an amplifier 80 produces a radiation power difference signal free from extraneous power on a line 82. This signal is weighted by means of a potentiometer 84 before being connected to the summing network 74 and the difference network 76. As described above, the output of the summing network 74 is a temperature signal and the output of the difference network 76 represents a temperature independent target identification signal.

In the system of FIG. 3, $u_1$ and $u_2$, given by Equation 16, represent inputs into the sum and difference networks 74 and 76 after appropriate weighting by the potentiometers 72 and 84. Note that since $u_1$ and $u_2$ are zero when looking at the reference target 24, both the composition and temperature signals will be automatically zero.

To calibrate the system of FIG. 3, first the potentiometer 78 is adjusted to produce a fixed gain of $(g_2/g_1)^2$ for the voltage at the wiper arm of the potentiometer 72. Next, the potentiometers 72 and 84 are adjusted back and forth to produce a normalization of the temperature signal at terminal 75 and a zero output at the terminal 77 when looking at two reference sources having the same emissivity. This adjustment determines the unknowns in the equations:

$$R_{72}V_{72} + R_{84}V_{84} = 1 \qquad (21)$$
$$R_{72}V_{72} - R_{84}V_{84} = 0 \qquad (22)$$

where Equation 21 represents the operation of the network 74 and Equation 22 represents the operation of network 76. The (R) terms are the ratio settings of the potentiometers 72 and 84, and V represents the voltages applied to these potentiometers. Note that some back and forth adjustment could be avoided by using ganged potentiometers to calibrate the system. The system of FIG. 3 produces a normalized power difference from the target 10 to that emitted from the reference source 24 at the outputs of the networks 74 and 76 for two independent wavelengths. However, because of the $qt$ cross term Equation 16, this linear substraction produces only a quasi-temperature independent signal.

In addition to temperature independence, it is desirable to eliminate gray bodies (i.e., a body with constant emissivity over the frequency band of interest). This additional constraint requires an additional degree of freedom or a third spectral band connected to the difference network 48 of FIG. 1, and 76 of FIG. 3. A portion of such a system is shown in FIG. 4. The terminals 86 through 90 are connected to the outputs of individual logarithmic amplifiers such as described above in FIG. 1. As previously explained, each of these amplifiers produces a radiant power signal at a particular spectral band of radiant energy from a target and reference source. The signal at terminal 86, after being weighted by means of a variable resistor 92, connects to a summing network 94. The signal at terminal 87, weighted by means of a variable resistor 96, connects to the summing network 94; it is also weighted by means of a variable resistor 98 prior to connection to a summing network 100. Similarly, the signal on terminal 89 is weighted by means of variable resistors 102 and 104 prior to being transmitted to summing networks 100 and 106, respectively. A signal at terminal 90, after being weighted by means of a variable resistor 108 connects to the summing network 106. The third input signal to each of the summing networks 94, 100 and 106 is transmitted from terminal 88 through an inverter amplifier 110.

For N spectral bands, it is only necessary to have N−2 independent groupings to obtain all of the information available for pattern recognition. However, for accuracy considerations, the redundancy provided by additional groupings might be desirable. Calibration of the system shown in FIG. 4 would proceed by first adjusting the resistors 92 and 96 until the output of the summing network 94 is zero for radiant energy from two reference sources positioned at the target 10 location and compared with the energy from the reference source 24.

The first reference source at the target location would be at the temperature of the reference source 24 but have a different emissivity, and the second reference source at the target location would have the same emissivity at a different temperature. Next, the resistors 98 and 102 are adjusted until the output of the summing network 100 is zero and finally the resistors 104 and 108 are adjusted until the output of the summing network 106 is zero for both reference sources at the target location. Note some back and forth adjustment may be required to produce the desired zero output signals. Non-gray bodies will produce finite values at the output terminals of the networks 94, 100 and 106 which can be combined in a recognition filter (not shown) to identify the composition of the target 10, independent of temperature. A target temperature signal can be generated by the system of FIG. 4 by adding the additional circuitry as described above for FIGS. 1 and 3.

Referring to FIGS. 5A–5D, there is shown the emissivity versus wavelength curves for four typical materials. The following table illustrates how the temperature independent signals of the systems described above can be used to classify infrared targets; the wavelengths chosen for this sample were 9 and 12 microns:

| Material: | $\rho(9, 12)$ |
|---|---|
| Colts neck loam | −1.11 |
| Green mountain laurel | 0.057 |
| Zinc oxide paint | 3.96 |
| Ferrous oxide paint | 5.40 |

Referring this information to the plots of FIGS. 5A–5D, for "Colts Neck Loam" the voltage at terminal 56 of FIG. 1 would indicate that at 12 microns the emissivity is greater than at 9 microns by a factor of 1.11. Similarly, for "Green Mountain Laurel" the emissivity at 12 microns is greater than at 9 microns by a factor of 0.057. On the other hand, for "Zinc Oxide Paint" and "Ferrous Oxide Paint," the signal at terminal 56 indicates that the emissivity at 12 microns is less than at 9 microns for these materials. Thus, by comparing the difference voltage at terminal 56 with known emissivity curves, a particular material can be identified. To enhance the ability of positively identifying a material, additional spectral bands would be employed such as shown in FIG. 4. The more difference signals produced, the greater the chance of positive material identification.

While several embodiments of the invention, together with modifications thereof, have been described herein and shown in the accompanying drawings, it will be evident that various further modifications are possible in the arrangement and construction of components without departing from the scope of the invention as set forth in the appended claims.

What is claimed is:

1. Apparatus for radiometric target identification comprising:
   means responsive to the radiation power from a target and a reference source at several independent wavelength bands for generating a power difference signal free of extraneous power signals for each wavelength band, and
   means for producing a temperature independent target composition identification signal from pairs of said power difference signals at two independent wavelength bands.

2. Apparatus for radiometric target identification as set forth in claim 1 including means for producing a target temperature signal from pairs of said power difference signals at two independent wavelengths.

3. Apparatus for radiometric target identification as set forth in claim 1 where said means for producing a temperature independent target composition indentification signal includes a difference network for subtracting two of said power difference signals.

4. Apparatus for radiometric target identification as set forth in claim 1 including means for weighting each of said power difference signals from said responsive means.

5. Apparatus for radiometric target identification as set forth in claim 2 wherein said means for producing a target temperature signal includes a summing network for adding two of said power difference signals.

6. Apparatus for radiometric target identification comprising:
   at least two means responsive to the radiation power from a target and a reference body, each said responsive means generating target and reference source signals for a pre-selected wavelength,
   means for producing a radiation power difference signal for each of said responsive means from the target and reference source signals independent of extraneous power signals,
   means for weighting the radiation power difference signals,
   amplifier means for each of said weighted power difference signals generating a signal equal to the logarithm of the quotient of the target and the reference radiation power levels, and
   means for producing temperature independent target identification signals from at least two of said power difference signals, each of an independent wavelength.

7. Apparatus for radiometric target identification as set forth in claim 6 including means for inverting the logarithmic power difference signal of one wavelength.

8. Apparatus for radiometric target identification as set forth in claim 6 including means for biasing each of said weighted power difference signals from a DC voltage source.

9. Apparatus for radiometric target identification as set forth in claim 8 wherein said amplifiers produce logarithmic signals thereby removing the product of relative emissivity change and relative reference source power change from the weighted and biased power difference signal for each wavelength.

10. Apparatus for radiometric target identification as set forth in claim 6 including means for producing a target temperature signal from pairs of said power difference signals at two independent wavelengths.

11. The method of radiometric target identification comprising:
   generating at least two signals representing the power difference between target radiation power and a reference source radiation power at selected wavelength bands, said power difference signals having extraneous power signals effectively removed therefrom, and
   producing a temperature independent target composition identification signal from at least two of said power difference signals of independent wavelengths.

12. The method of radiometric target identification as set forth in claim 11 including the step of producing a target temperature signal from at least two of said power difference signals of independent wavelengths.

13. The method of radiometric target identification as set forth in claim 11 including the step of weighting each of said power difference signals.

14. The method of radiometric target identification as set forth in claim 13 including the step of generating the logarithm of the power difference signals prior to producing the temperature independent composition identification signal.

15. The method of radiometric target identification as set forth in claim 14 including the step of biasing the weighted power difference signal prior to taking the logarithm thereof.

16. The method of radiometric target identification as set forth in claim 15 including the step of producing a target temperature signal from pairs of said power difference signals of two independent wavelengths.

References Cited

UNITED STATES PATENTS

| | | | |
|---|---|---|---|
| 2,517,554 | 8/1950 | Frommer | 250—214 |
| 3,057,200 | 10/1962 | Wood | 73—355 |
| 3,084,253 | 4/1963 | McHenry et al. | |
| 3,234,380 | 2/1966 | Liston et al. | |
| 3,304,425 | 2/1967 | Astheimer. | |
| 3,436,541 | 4/1969 | Boronkay. | |

A. R. BORCHELT, Primary Examiner

MORTON J. FROME, Assistant Examiner

U.S. Cl. X.R.

73—355